(12) United States Patent
Chen et al.

(10) Patent No.: US 7,483,264 B2
(45) Date of Patent: Jan. 27, 2009

(54) MOUNTING ASSEMBLY FOR COVER OF COMPUTER ENCLOSURE

(75) Inventors: Yun-Lung Chen, Tu-Cheng (TW); Jun Tang, Shenzhen (CN); Shao-Bin Zhang, Shenzhen (CN); Zhou Xu, Shenzhen (CN)

(73) Assignees: Hong Fu Jin Precision Industry (Shenzhen) Co., Ltd., Bao-an District, Shenzhen, Quangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 522 days.

(21) Appl. No.: 11/193,900

(22) Filed: Jul. 29, 2005

(65) Prior Publication Data

US 2006/0092603 A1    May 4, 2006

(30) Foreign Application Priority Data

Oct. 30, 2004    (CN) .................... 2004 2 0094722 U

(51) Int. Cl.
*G06F 1/16*    (2006.01)

(52) U.S. Cl. .................... 361/683; 361/724; 312/223.1; 312/223.2

(58) Field of Classification Search ......... 361/679–686, 361/724–727; 312/223.1, 223.2
See application file for complete search history.

(56) References Cited

U.S. PATENT DOCUMENTS

| | | | | |
|---|---|---|---|---|
| 4,909,579 A | * | 3/1990 | Liu ..................... | 312/223.2 |
| 5,154,456 A | * | 10/1992 | Moore et al. ............ | 292/162 |
| 6,296,334 B1 | * | 10/2001 | Liao ..................... | 312/223.2 |
| 6,572,205 B2 | * | 6/2003 | Tagawa ................ | 312/223.1 |
| 6,903,933 B2 | * | 6/2005 | Wang .................... | 361/727 |
| 2006/0108812 A1 | * | 5/2006 | Chen et al. ............. | 292/300 |
| 2006/0139864 A1 | * | 6/2006 | Chen et al. ............. | 361/683 |

FOREIGN PATENT DOCUMENTS

| | | |
|---|---|---|
| CN | 02225893.0 | 1/2003 |
| TW | 087213422 | 4/2000 |

* cited by examiner

*Primary Examiner*—Jayprakash N Gandhi
*Assistant Examiner*—Anthony Q Edwards
(74) *Attorney, Agent, or Firm*—Morris Manning Martin LLP; Tim Tingkang Xia, Esq.

(57) ABSTRACT

A mounting assembly for a cover of a computer enclosure includes a chassis (40) having a side panel, at least one locking member (20) securely attached to the chassis (40), a cover (10) adapted to be slidably mounted to the chassis (40) and at least one jacking member (30) movably mounted to the chassis (40). A projecting tab (122) extends from a side panel (12) of the cover (10) and a stopping tab (123) extends from an inner side of the side panel (12) thereof. The jacking member (30) has a jacking portion (32) and a pressed portion (34). The jacking portion (32) is inserted between the locking member (20) and the side panel (41) of the chassis (40) for keeping the locking member (20) disengaging from the stopping tab (123). The pressed portion (34) is pressed by the projecting tab (122) for retracting the jacking portion (32).

20 Claims, 10 Drawing Sheets

MOUNTING ASSEMBLY FOR COVER OF COMPUTER ENCLOSURE

CROSS-REFERENCE TO RELATED APPLICATIONS

This application is related to a co-pending U.S. patent application Ser. No. 11/114,806, entitled "LATCH FOR SECURING COVER TO COMPUTER ENCLOSURE" and filed on Apr. 26, 2005. The disclosure of the above identified applications is incorporated herein by reference.

BACKGROUND OF THE INVENTION

1. Field of the Invention

The present invention relates to a mounting assembly for a cover of a computer enclosure, and more particularly to a mounting assembly for a cover of a computer enclosure for demounting or mounting a cover conveniently.

2. Background of the Invention

With the popularization of computer, our modern society is closely linked to computer. A computer enclosure generally includes a chassis and a cover assembled thereto. It is required that a computer cover should be demounted and mounted conveniently for checking malfunction of hardware and repairing interior components of a computer. A typical mounting assembly usually utilizes a plurality of screws, directly attaching a computer cover to a computer chassis. Thereby, screwdrivers or other detaching tools are necessary for installation or removal of the computer cover in assembly or disassembly processes, which is laborious and time-consuming.

Generally, the cover is assembled to the chassis by screws and which takes time in assembly and disassembly. This also inevitably increases the manufacturing cost. In addition, screws or the equivalents are also parts of inventory which should be carefully monitored in order to prevent a shutdown of the production line. Understandably, some attempts have been taken to introduce the snapping type enclosure by using less or without screws. Therefore, an improved mounting assembly for a cover of a computer enclosure which overcomes the above-mentioned problems is desired.

What is needed, therefore, is a mounting assembly for a cover of a computer enclosure facilitating engagement and disengagement between a cover and a chassis.

SUMMARY

A mounting assembly for a cover of a computer enclosure in accordance with a preferred embodiment of the present invention includes a chassis having a side panel, at least one locking member securely attached to the chassis, a cover adapted to be slidably mounted to the chassis and at least one jacking member movably mounted to the chassis. A projecting tab extends from a side panel of the cover and a stopping tab extends from an inner side of the side panel thereof. The jacking member has a jacking portion and a pressed portion. The jacking portion is inserted between the locking member and the side panel of the chassis for keeping the locking member disengaging from the stopping tab. The pressed portion is pressed by the projecting tab for retracting the jacking portion.

Other advantages and novel features of the present invention will be drawn from the following detailed description of preferred embodiment of the present invention with the attached drawings, in which:

DETAILED DESCRIPTION OF THE INVENTION

Figure 1:
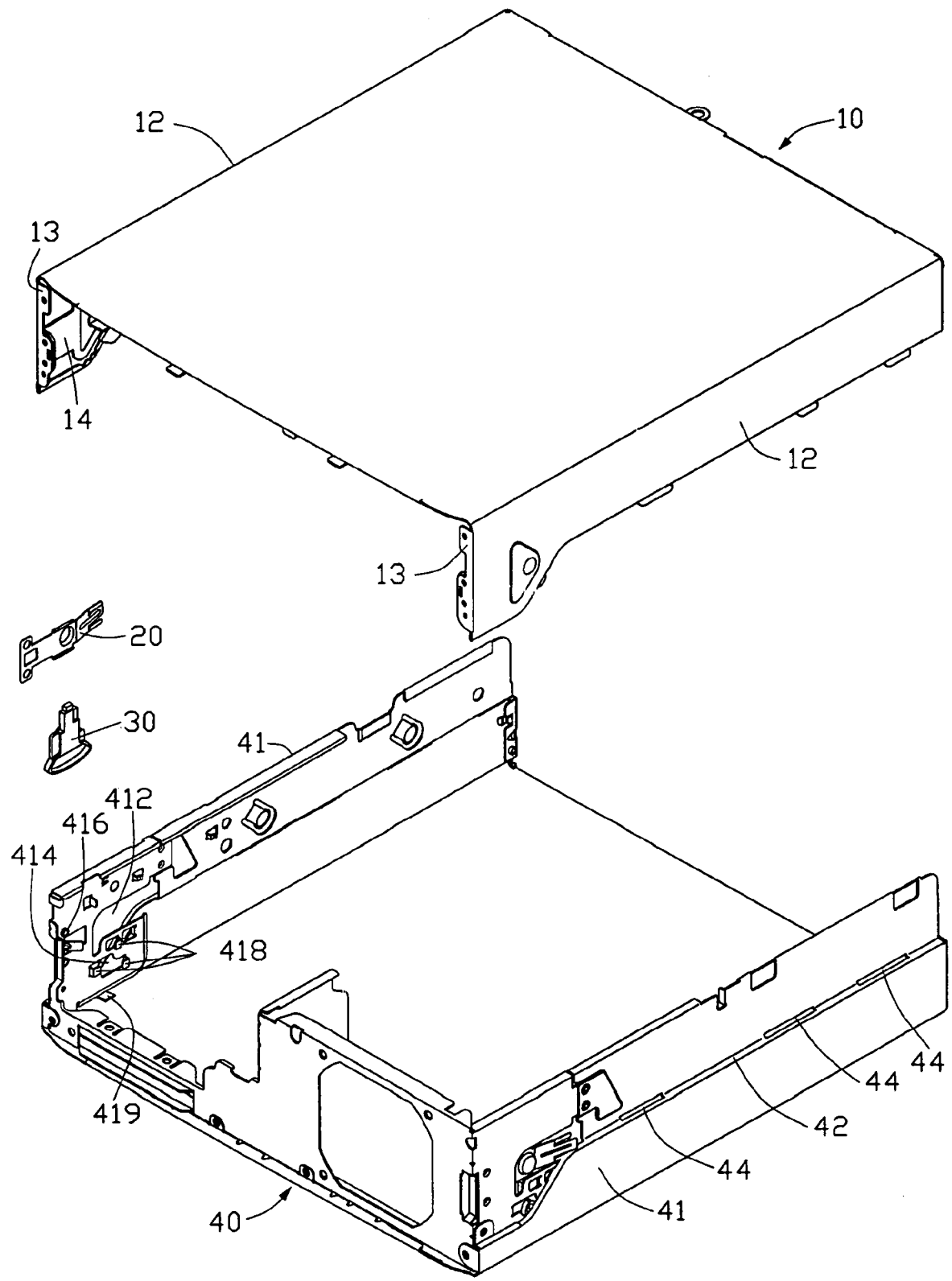
FIG. 1 is an exploded, isometric view of a mounting assembly for cover of computer enclosure in accordance with a preferred embodiment of the present invention including a cover, a locking member, a jacking member and a chassis.

Referring to FIG. 1, a mounting assembly for a cover of an enclosure of an electronic device like a computer in accordance with a first preferred embodiment of the present invention comprises a cover 10, a locking member 20, a jacking member 30 and a chassis 40.

Two opposite side panels 41 of the chassis 40 are symmetrical each other. Each side panel 41 defines a first opening 412 and a second opening 414 below the first opening 412. Two pillars 416 are extended inward from a front end of each side panel 41 of the chassis 40. An inner side of each side panel 41 is formed to have a plurality of positioning tabs 418 beside the second opening 414. Each side panel 41 is formed to have a shoulder 42 which defines a plurality of through slots 44 in a front to back direction.

Figure 2:
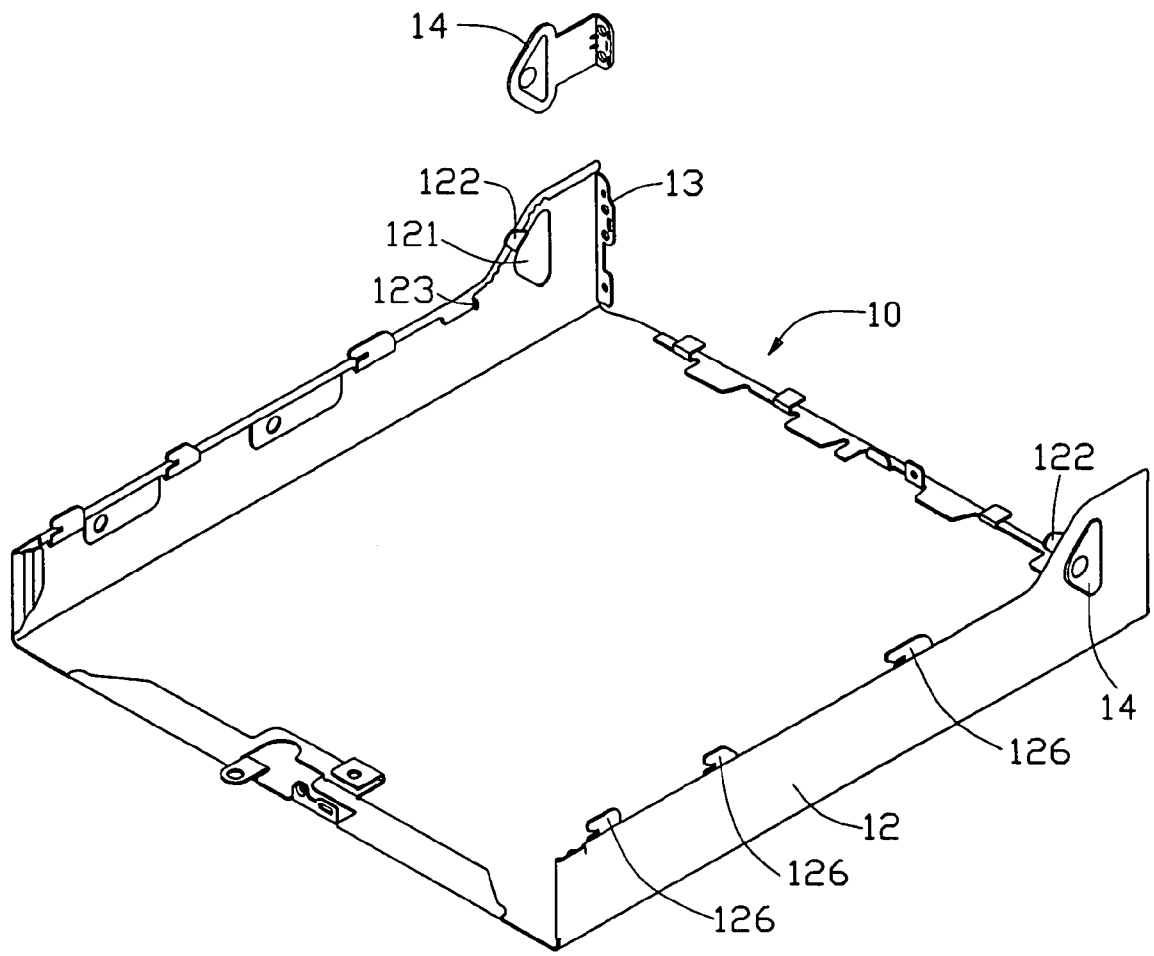
FIG. 2 is an enlarged, isometric view of the cover of FIG. 1.

Referring also to FIG. 2, the cover 10 includes two opposite side panels 12 and a distal end of each side panel 12 is bent inwardly and vertically to form a flange 13. A pressing tab 14 is mounted to each flange 13, and each side panel 12 defines an opening 121 corresponding to the pressing tab 14. Each side panel 12 forms a projecting tab 122 beside the opening 121. The inner side of each side panel 12 is formed to have a stopping tab 123. A plurality of hooks 126 corresponding to the through slots 44 are formed at an edge of each side panel 12 in the front to back direction thereon.

Figure 3:
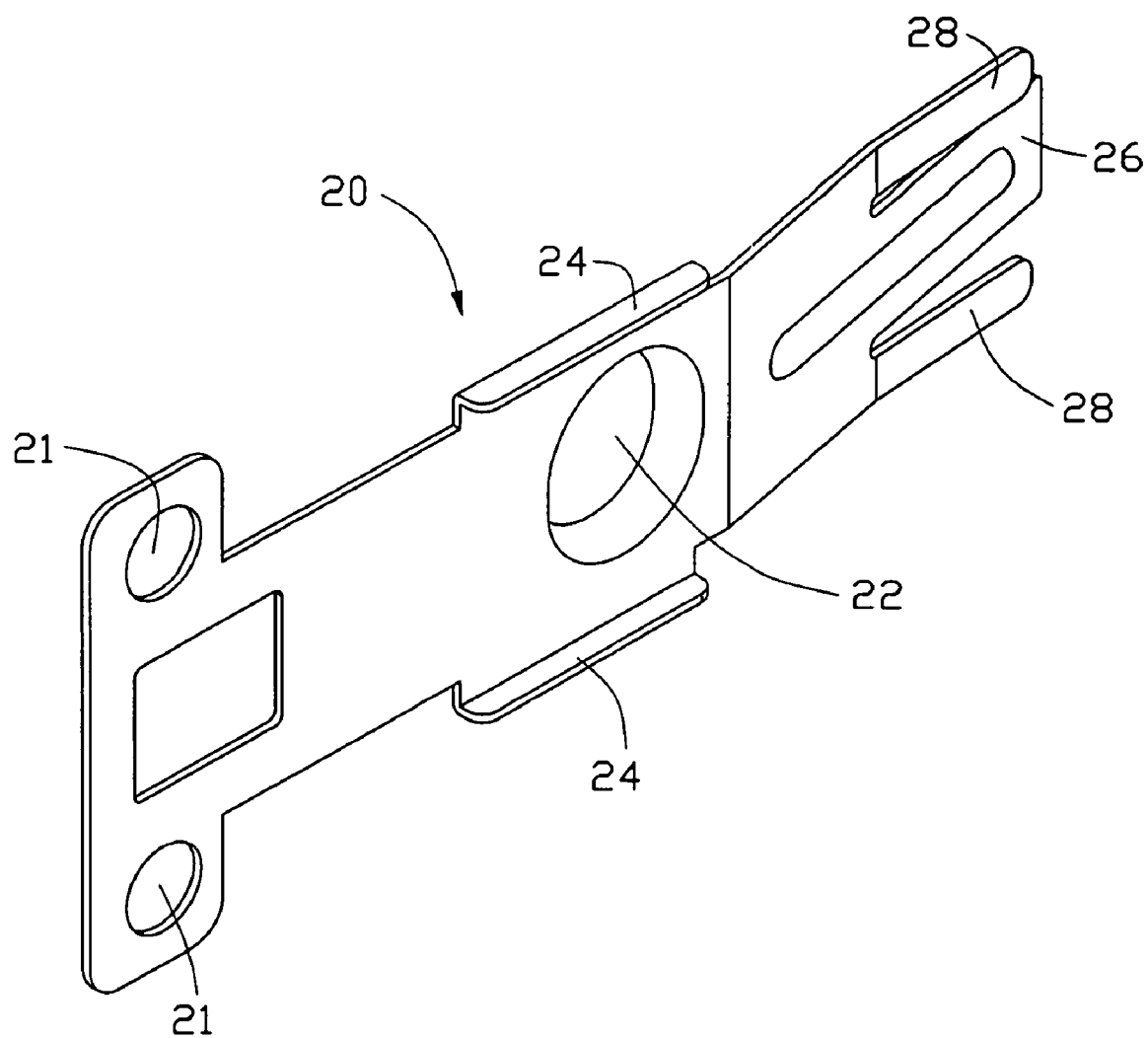
FIG. 3 is an enlarged, isometric view of the locking member of FIG. 1.

Referring to FIG. 3, the locking member 20 is made of a sort of elastic material. Two positioning holes 21 is defined at a front end of he locking member 20. A columniform protrusion 22 is extended outwardly from a middle portion of the locking member 20, and two strip-shaped flanges 24 are extended horizontally and inwardly from an upper and lower edges of the middle portion thereof. A rear end of the locking member 20 is bent outwardly. A first resisting portion 26 and two second resisting portions 28 are formed at a rear end of the locking member 20, and the two second resisting portions 28 locating at two sides of the first resisting portion 26.

Figure 4:
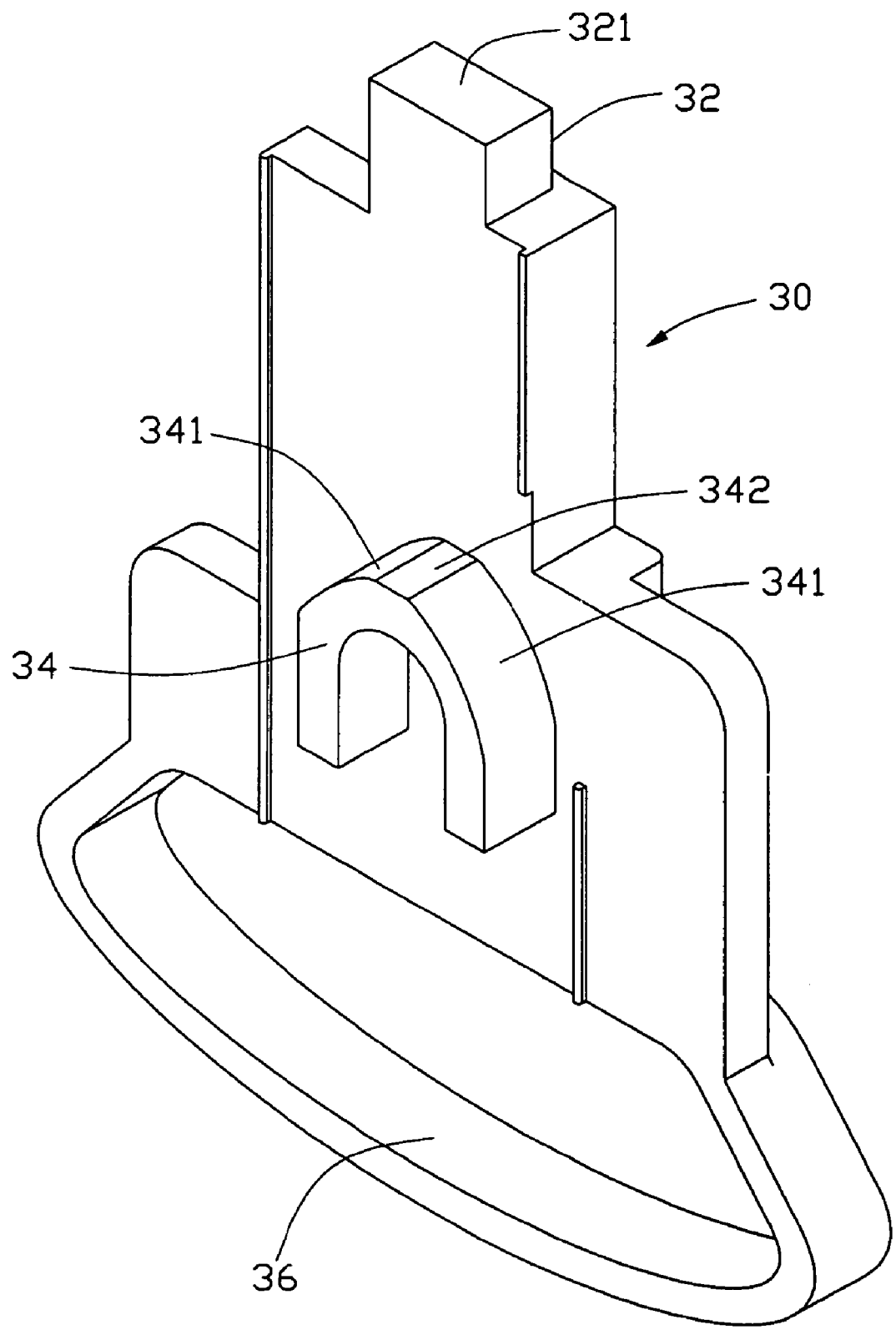
FIG. 4 is an enlarged, isometric view of the jacking member of FIG. 1, but viewed from another aspect.
Figure 5:
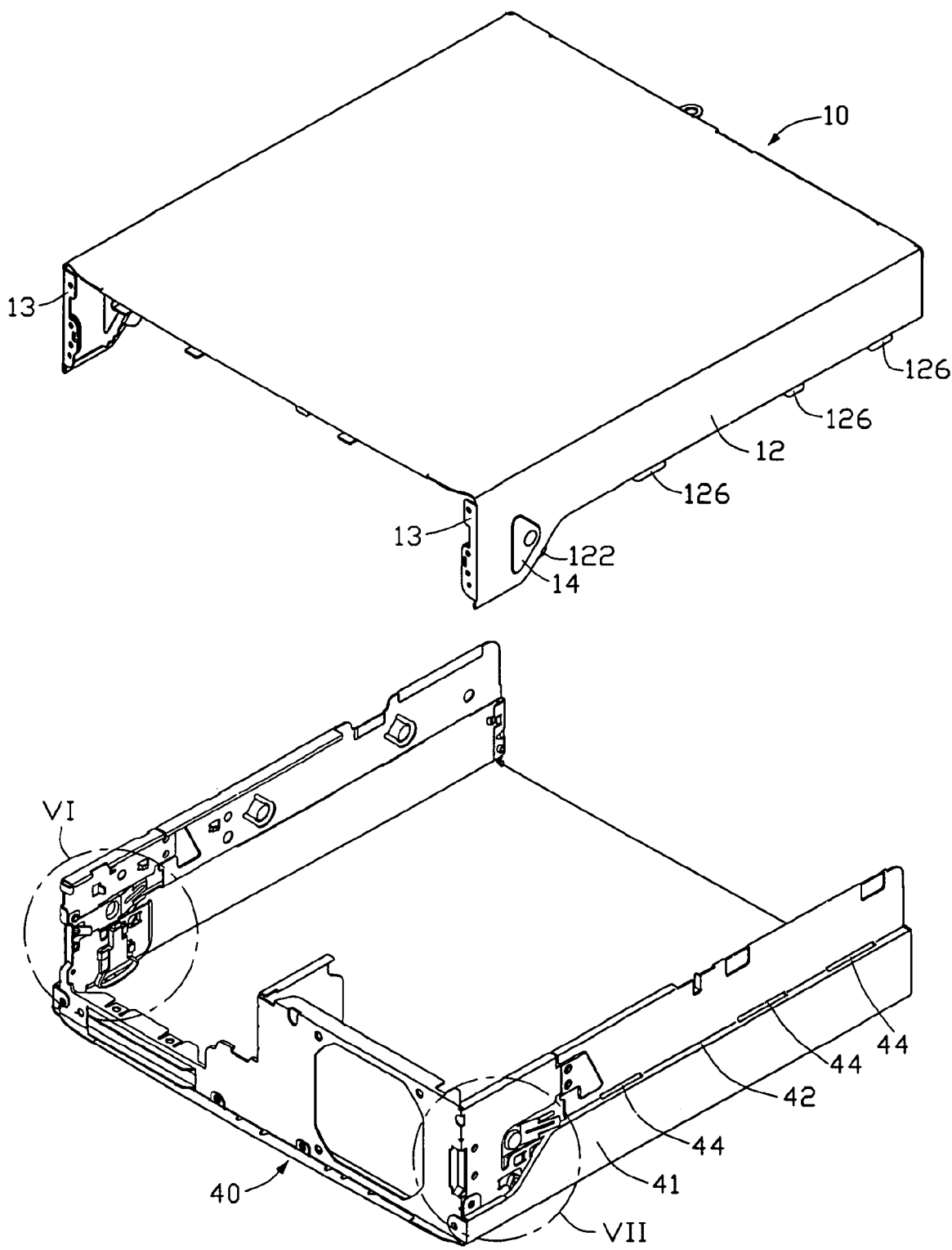
FIG. 5 is an pre-assembled isometric view of FIG. 1, with the cover separated from the chassis.
Figure 6:
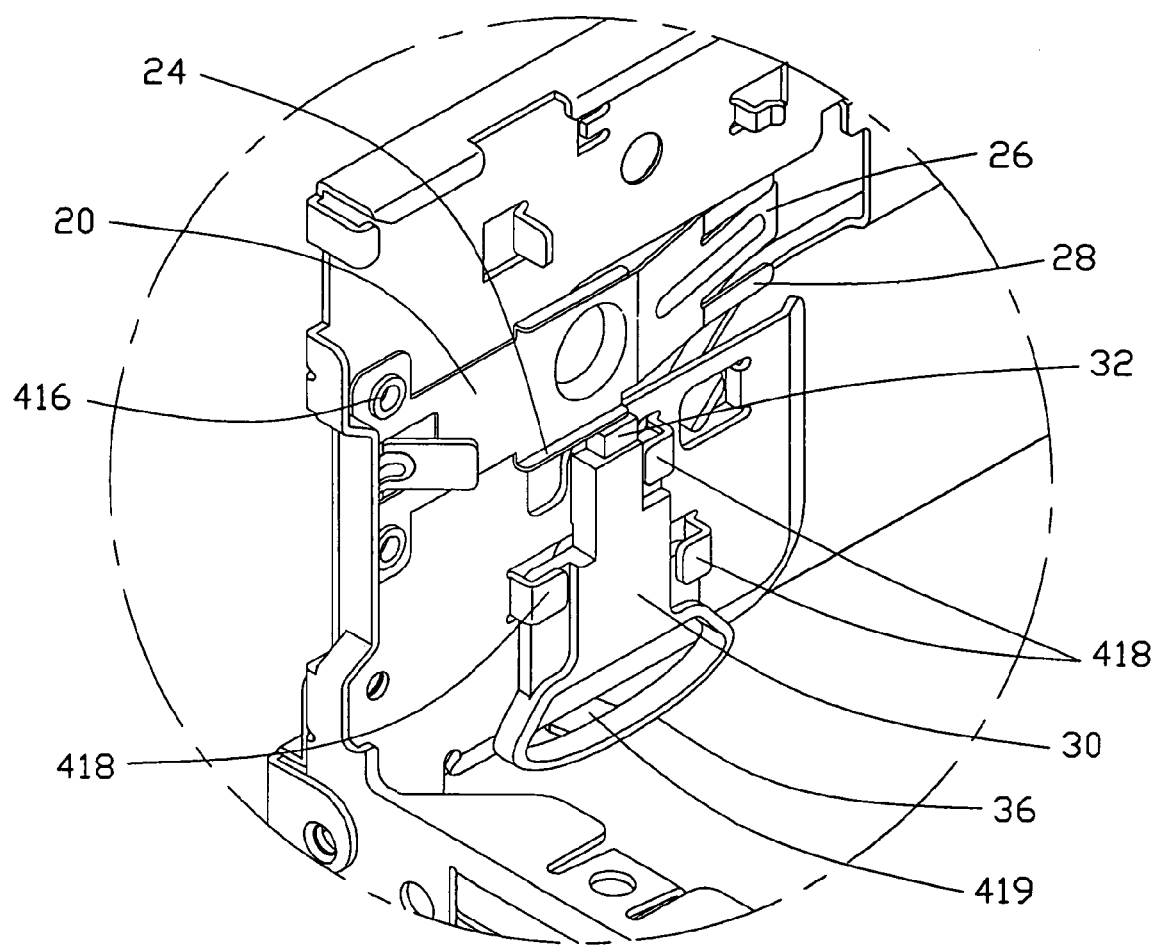
FIG. 6 is an enlarged, isometric view of part VI in FIG. 5.
Figure 7:
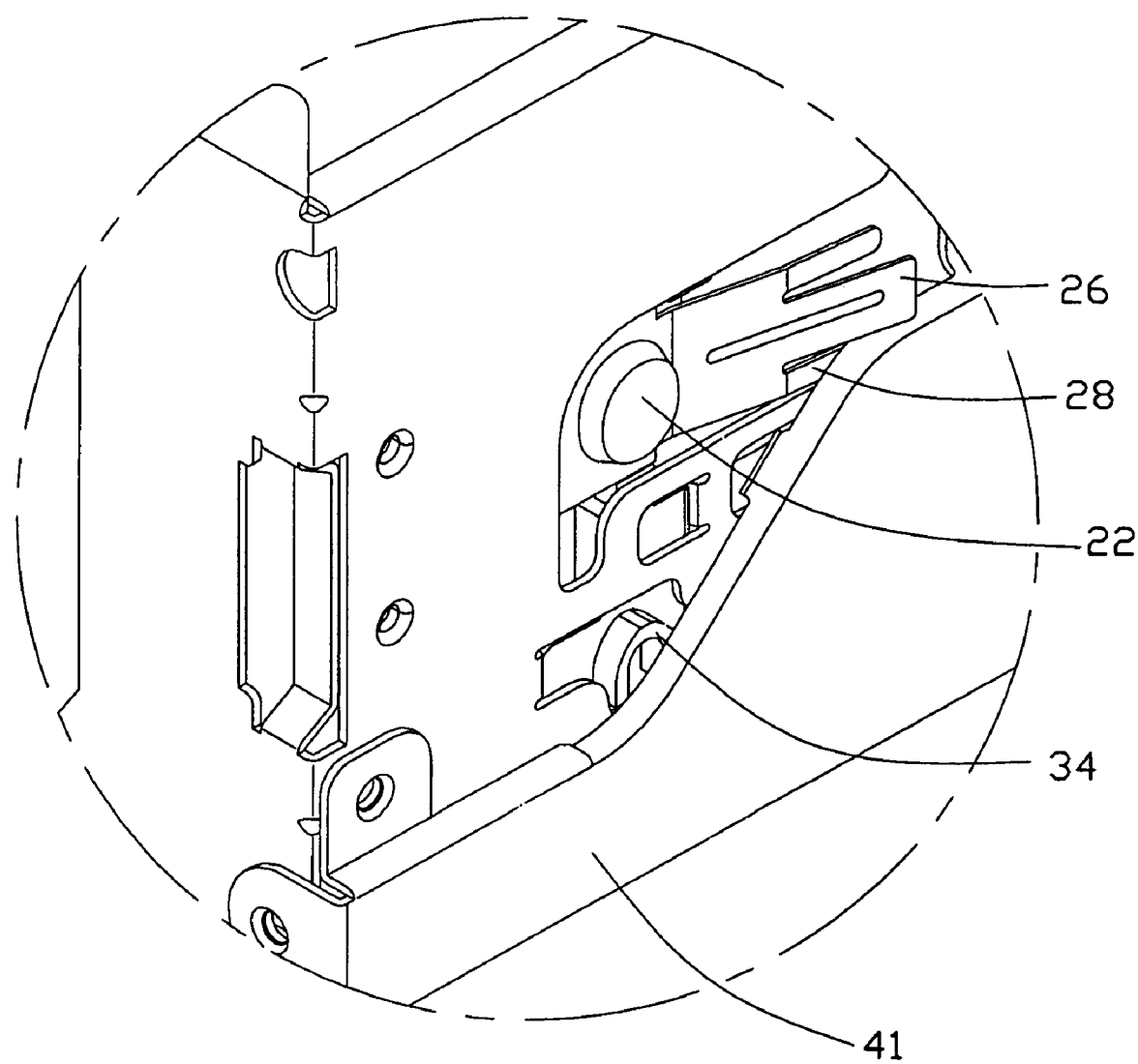
FIG. 7 is an enlarged, isometric view of part VII in FIG. 5.
Figure 8:
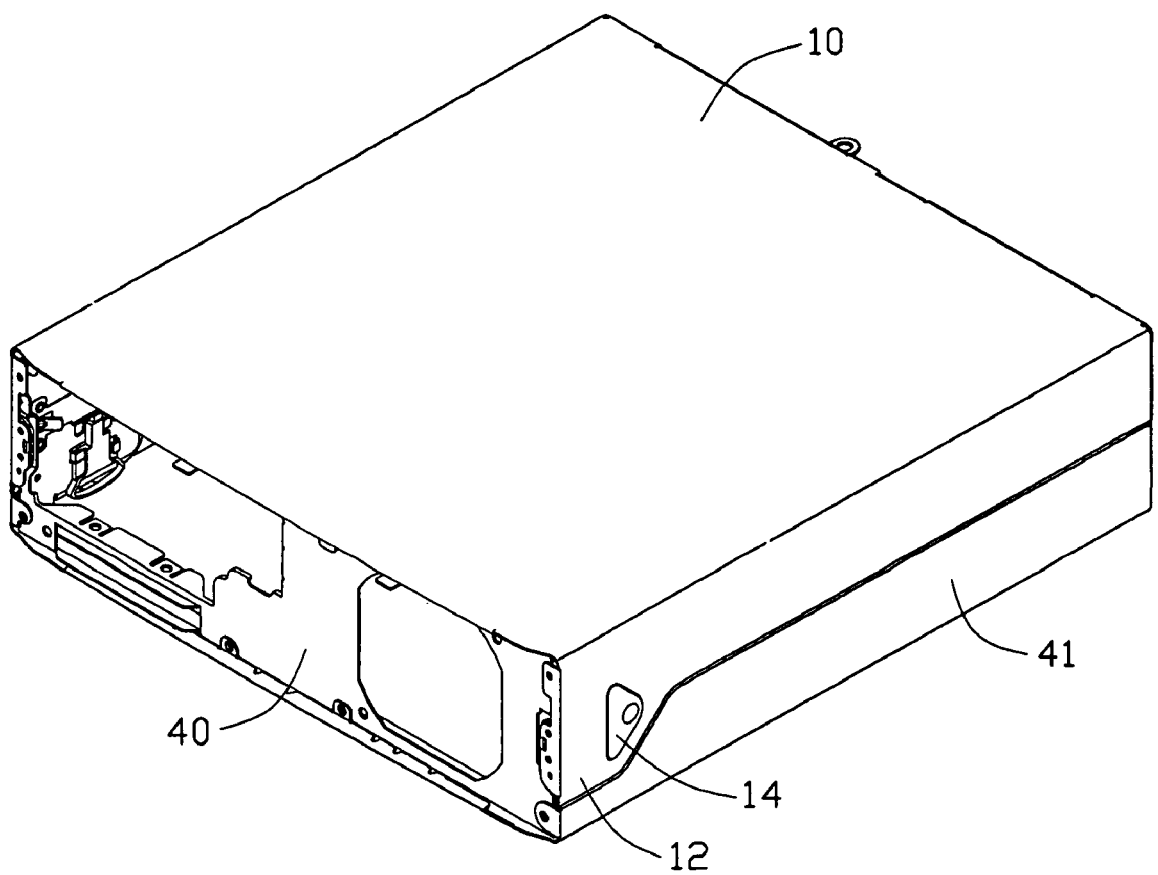
FIG. 8 is an assembled isometric view of FIG. 1.

Referring to FIG. 4, the jacking member 30 is key-shaped and received into a space enclosed by the three positioning tabs 418 and one supporting tab 419 on the side panel 41. The jacking member 30 has a jacking portion 32 with a top surface 321 at a top end thereof. A generally U-shaped block 34 with two symmetrical guiding surfaces 341 and a top surface 342 is embossed from a middle portion of the jacking member 30. A cambered elastic portion 36 is formed at a bottom of the jacking member 30.

Referring also to FIGS. 5, 6, 7 and 8, before the cover 10 is mounted to the chassis 40, the locking member 20 is rivetedly attached to an inner side of the side panel 41 of the chassis 40 with the positioning hole 21 fixed to the pillar 416. The first resisting potion 26 extends slantways and outwardly though the first opening 412, and the second resisting portion 28 below the first resisting portion 26 is stopped by the side panel 41 of the chassis 40 so as to maintain tension and contact of the locking member 20 against the side panel 41. The jacking member 30 has been movably received into a space enclosed by the plurality of positioning tabs 418 and the supporting tab 419. As the flange 24 of the locking member 20 is jacked by the jacking portion 32 of the jacking member 30, the elastic portion 36 of the jacking member 30 is compressed. When the cover 10 is mounted to the chassis 40, the hooks 126 of the cover 10 are firstly inserted in the through slots 44 of the side panel 41 of the chassis 40. Then the cover 10 is pushed horizontally and backwardly. The inner side of the side panel 12 of the cover 10 slides along the first resisting portion 26 of the locking member 20. The stopping tab 123 of the side panel 12 of the cover 10 pushes the first resisting portion 26 of the locking member 20 inwardly and finally snaps to the first resisting portion 26 of the locking member 20. The cover 10 is thus engaged with the chassis 40. During the course of pushing the cover 10, the flange 24 of the locking member 20 is all along jacked by the jacking portion 32 all along.

Figure 9:
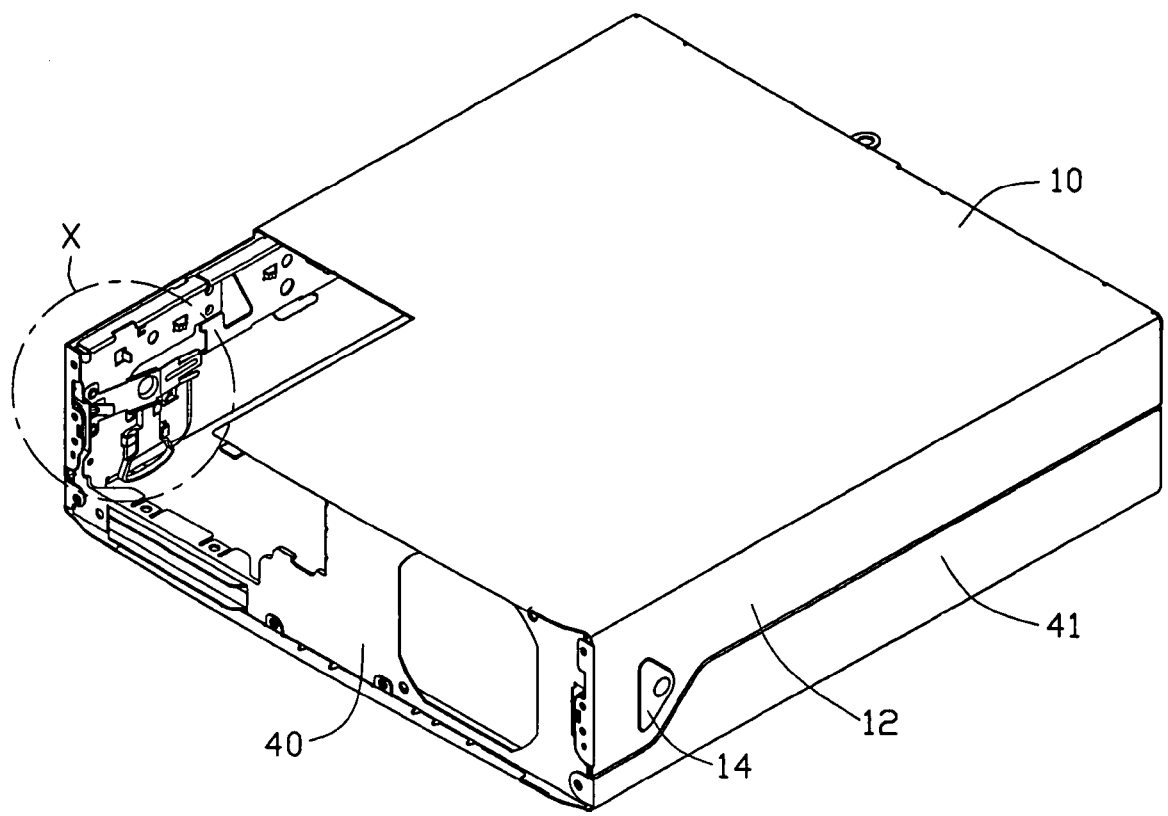
FIG. 9 is an isometric view of the mounting assembly before the cover is detached from the chassis.
Figure 10:
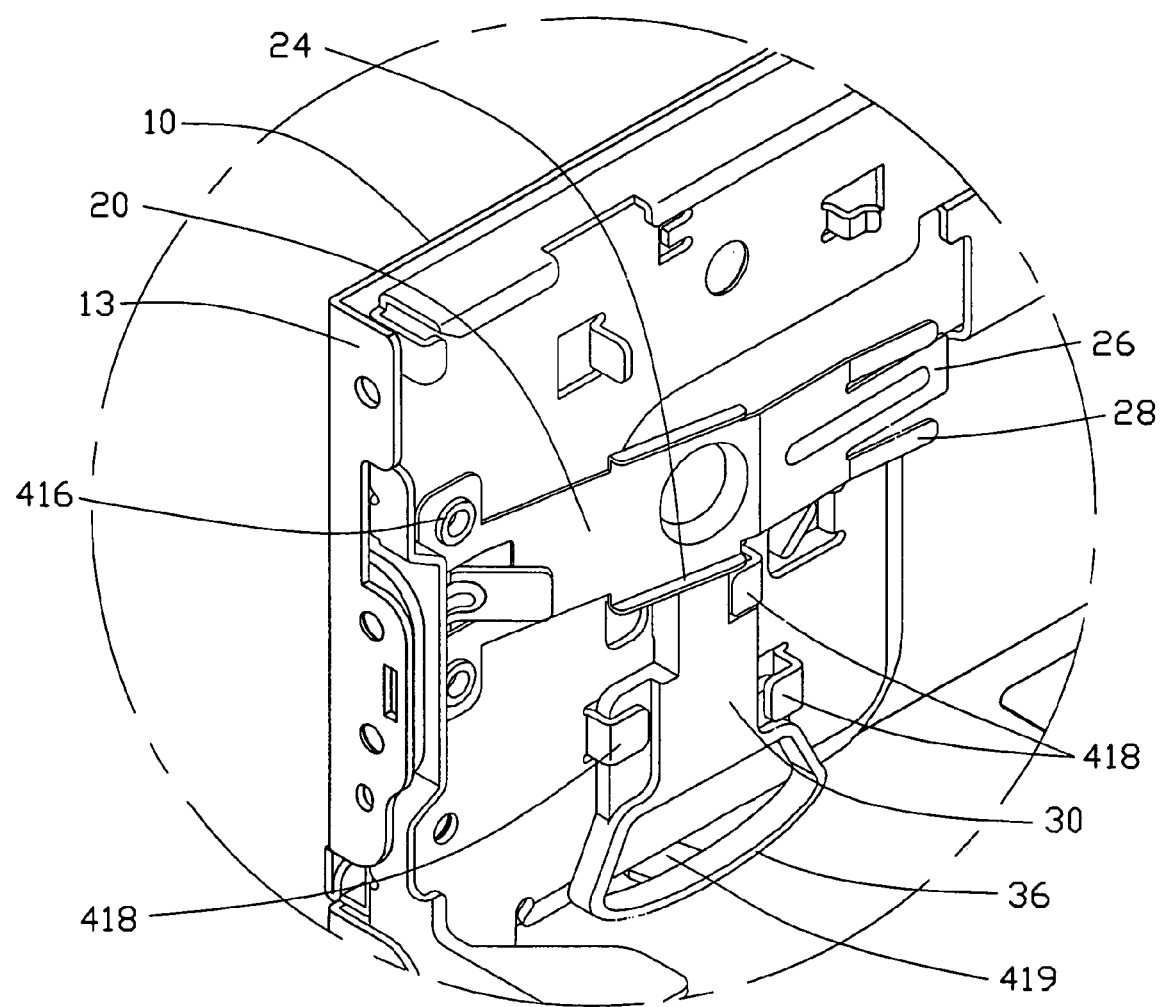
FIG. 10 is an enlarged, isometric view of part X in FIG. 9.

Referring to FIGS. 9 and 10, in disassembly of the cover 10, the pressing tab 14 is pressed to push the columniform protrusion 22 of the locking member 20 inwardly. Therefore, the distal end of the first resisting portion 26 escapes from the stopping tab 123. A gap is generated between the locking member 20 and the side panel 41 of the chassis 40. The jacking portion 32 of the jacking member 30 is lifted to insert into the gap due to the resilience of the elastic portion 36 thereof. Thus, the jacking portion 32 of the jacking member 30 is situated between the locking member 20 and the side panel 41 of the chassis 40. The locking member 20 is kept from reinstating. The cover 10 is ready to be pulled off. As the cover 10 is pulled off, the projecting tab 122 of the cover 10 press the guiding surface 341 of the block 34 to cause the jacking member 30 to move downwardly. Consequently, the elastic portion 36 of the jacking member 30 is compressed again. When the cover 10 is further pulled, the top surface 342 of the block 34 is pressed by the projecting tab 122 of the side panel 12 so that the jacking portion 32 is retreated from the gap between the locking member 20 and the side panel 41 of the chassis 40. Thereby, after the cover 10 is removed from the chassis 40, the locking member 20 and the jacking member 30 get back to the original position. The flange 24 of the locking member 20 resumes to be jacked by the top surface 321 of the jacking portion 32.

While the present invention has been illustrated by the description of preferred embodiment thereof, and while the preferred embodiment has been described in considerable details, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative example shown and described.

We claim:

1. A computer enclosure comprising:
   a chassis having a side panel, at least one locking member being attached thereto;
   a cover adapted to be slidably mounted to the chassis, the cover having a projecting tab and a stopping tab, wherein the stopping tab directly engages with the locking member for securing the cover on the chassis; and
   at least one jacking member movably mounted to the chassis, comprising a pressed portion and a jacking portion inserted between the locking member and the side panel of the chassis for keeping the locking member disengaging from the stopping tab, the pressed portion being pushed by the projecting tab for retracting the jacking portion.

2. The computer enclosure as recited in claim 1, wherein a pressing tab is attached on the cover for pushing the locking member, and the pressing tab is accessible outside.

3. The computer enclosure as recited in claim 2, wherein the locking member further comprises a columniform protrusion corresponding to the pressing tab.

4. The computer enclosure as recited in claim 1, wherein a lower edge of the locking member is bent horizontally to form a flange for abutting on the jacking member.

5. The computer enclosure as recited in claim 1, wherein the locking member has a resilient first resisting portion extending slantways for engaging with the stopping tab.

6. The computer enclosure as recited in claim 5, wherein the locking member is attached inside the chassis and a first opening is defined in the chassis for the first resisting portion extending outwardly therethough.

7. The computer enclosure as recited in claim 1, wherein the jacking member forms an elastic portion at a bottom thereof.

8. The computer enclosure as recited in claim 1, wherein a second opening is defined in the chassis for the pressed portion of the jacking member accessible to the projecting tab.

9. The computer enclosure as recited in claim 1, wherein the pressed portion of the jacking member is a generally U-shaped block with two guiding surfaces and a top surface.

10. A computer enclosure comprising:
    a chassis comprising a side panel thereof, at least one locking member attached thereto;
    a cover adapted to be slidably mounted to the chassis, comprising a stopping tab engaging with the locking member for securing the cover on the chassis, wherein the locking member has a resilient first resisting portion extending slantways for engaging with the stopping tab; and
    a jacking member for disengaging the locking member from the stopping tab when situated between the locking member and the side panel of the chassis, and means for driving the jacking member to move.

11. The computer enclosure as recited in claim 10, wherein a pressing tab is attached on the cover for pushing the locking member, and the pressing tab is accessible outside.

12. The computer enclosure as recited in claim 11, wherein the locking member further comprises a columniform protrusion corresponding to the pressing tab.

13. The computer enclosure as recited in claim 10, wherein a lower edge of the locking member is bent horizontally to form a flange for abutting on the jacking member.

14. The computer enclosure as recited in claim 13, wherein the jacking member forms a jacking portion at a top end thereof for jacking the flange.

15. The computer enclosure as recited in the claim 10, wherein the locking member is attached inside the chassis and a first opening is defined in the chassis for the first resisting portion extending outwardly therethough.

16. The computer enclosure as recited in the claim 10, wherein a second opening is defined in the chassis for a pressed portion of the jacking member accessible to a projecting tab extending from the cover.

17. The computer enclosure as recited in the claim 16, wherein the pressed portion of the jacking member is a generally U-shaped block with two guiding surfaces and a top surface.

18. An enclosure of an electronic device, comprising:

a chassis partially enclosing said electronic device, and having a locking member movably attachable thereto along a first direction;

a cover cooperatively enclosing said electronic device with said chassis, and movable relative to said chassis along a second direction perpendicular to said first direction between a first position thereof to be retainable to said chassis and a second position thereof to be freely removable away from said chassis, said locking member of said chassis capable of retaining said cover in said first position thereof by interferingly moving toward said cover along said first direction; and a jacking member disposed next to said locking member in said chassis and resiliently movable along a third direction parallel to said second direction to control movement of said locking member along said first direction.

19. The enclosure as recited in the claim 18, wherein said locking member comprises a resilient resisting portion extending slantways for engaging with a stopping tab of said cover.

20. The enclosure as recited in the claim 19, wherein said locking member is attached inside said chassis and an opening is defined in said chassis for said resisting portion extending outwardly therethough.

\* \* \* \* \*